Sept. 25, 1934.  S. BERGSTEIN  1,974,408

MACHINE AND METHOD FOR MAKING KNOCKDOWN BOXES

Filed May 7, 1934   7 Sheets-Sheet 1

INVENTOR.
SAMUEL BERGSTEIN.
BY
Allen & Allen
ATTORNEYS.

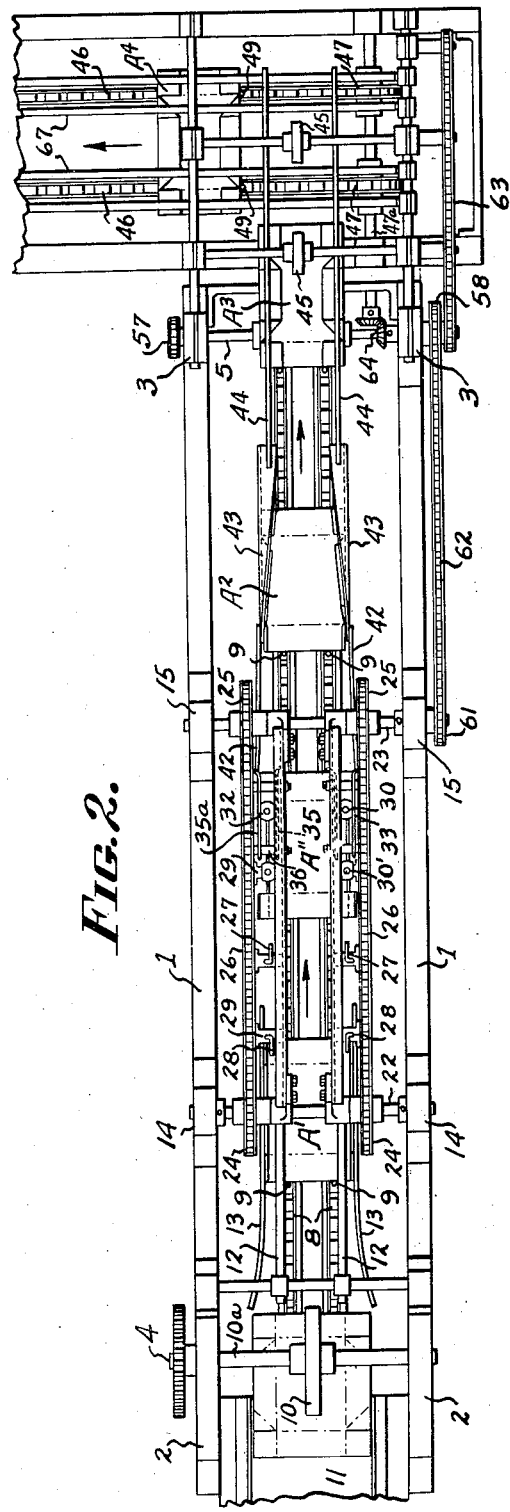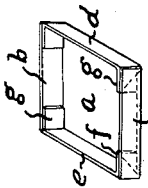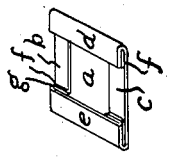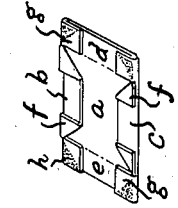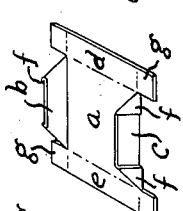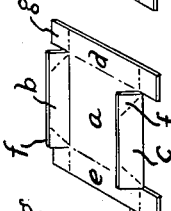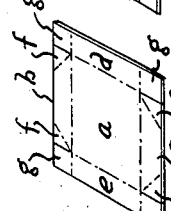

Sept. 25, 1934.  S. BERGSTEIN  1,974,408
MACHINE AND METHOD FOR MAKING KNOCKDOWN BOXES
Filed May 7, 1934   7 Sheets-Sheet 4
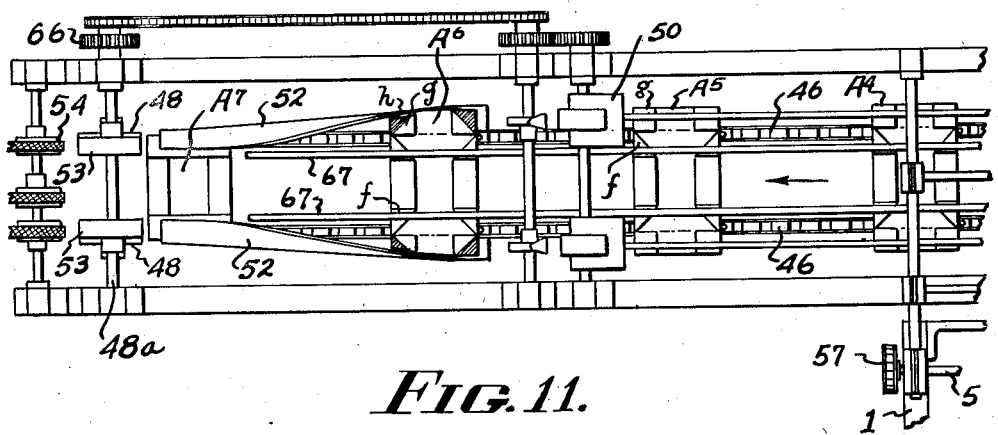
FIG.11.
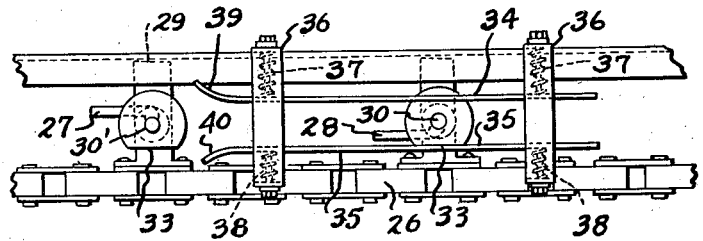
FIG.12.
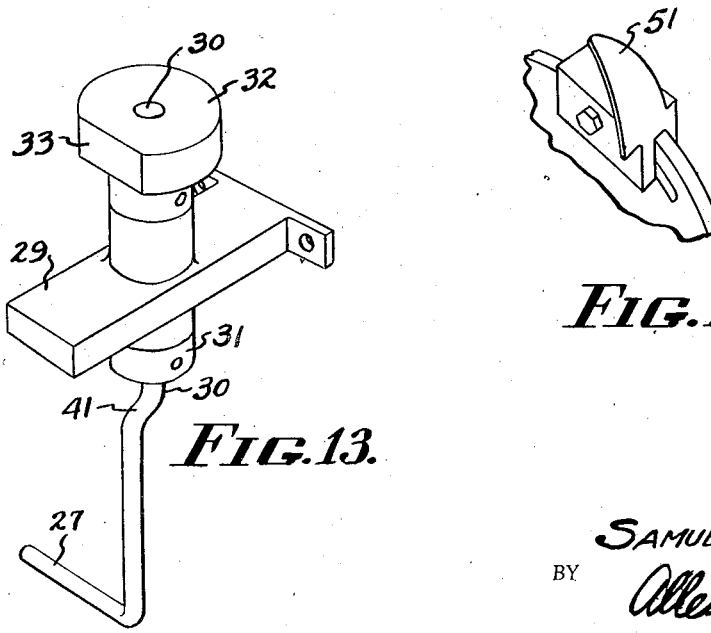
FIG.13.
FIG.14.
INVENTOR.
SAMUEL BERGSTEIN.
BY Allen + Allen
ATTORNEYS.

Sept. 25, 1934.   S. BERGSTEIN   1,974,408
MACHINE AND METHOD FOR MAKING KNOCKDOWN BOXES
Filed May 7, 1934   7 Sheets-Sheet 5

INVENTOR.
SAMUEL BERGSTEIN.
BY
Allen & Allen
ATTORNEYS.

Sept. 25, 1934.   S. BERGSTEIN   1,974,408
MACHINE AND METHOD FOR MAKING KNOCKDOWN BOXES
Filed May 7, 1934   7 Sheets-Sheet 6
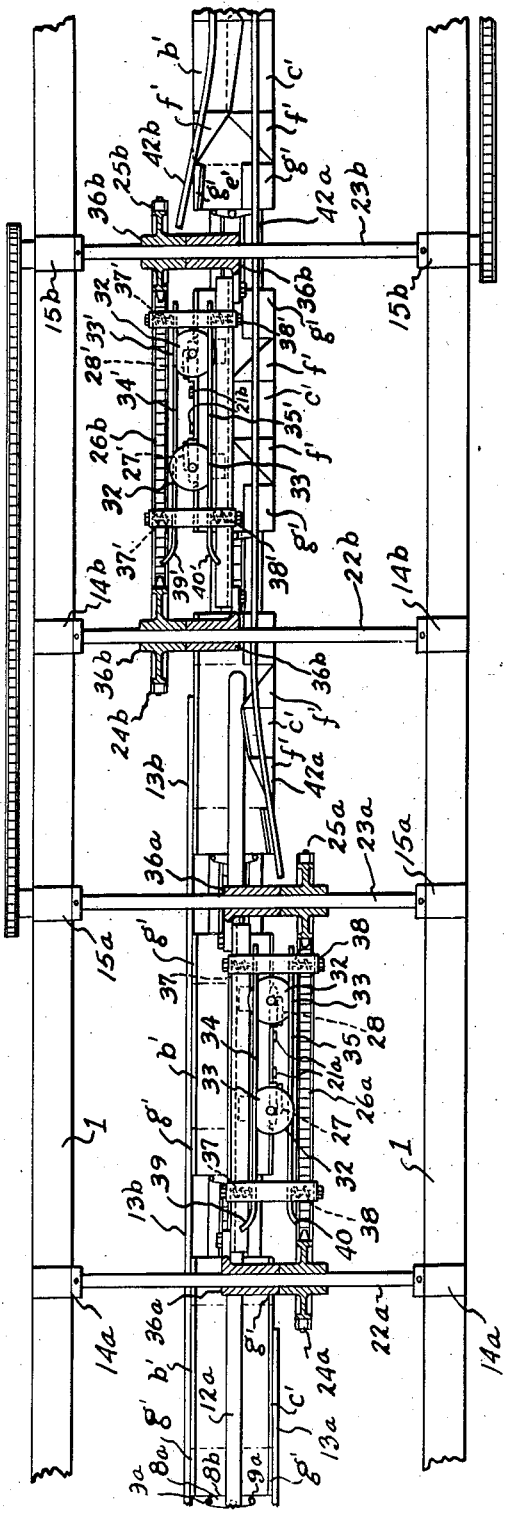
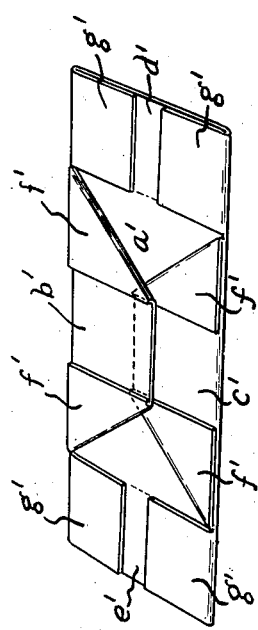
INVENTOR.
SAMUEL BERGSTEIN.
BY
ATTORNEYS.

Sept. 25, 1934.  S. BERGSTEIN  1,974,408
MACHINE AND METHOD FOR MAKING KNOCKDOWN BOXES
Filed May 7, 1934  7 Sheets-Sheet 7

INVENTOR.
SAMUEL BERGSTEIN.
BY Allen + Allen
ATTORNEYS.

Patented Sept. 25, 1934

1,974,408

UNITED STATES PATENT OFFICE 1,974,408

MACHINE AND METHOD FOR MAKING KNOCKDOWN BOXES

Samuel Bergstein, Cincinnati, Ohio

Application May 7, 1934, Serial No. 724,271

20 Claims. (Cl. 93—49)

My invention relates to the manufacture of the type of boxes commonly known in the trade as knock-down or wall boxes, which are furnished in flat and collapsed condition in order to save space in store rooms, and in which prior to use, the boxes may, by a simple manual manipulation, be opened up so as to receive their contents.

Boxes of this type to which my invention relates and a machine and method of making same, are disclosed in my Patent No. 1,926,364, of May 24, 1933, it being an object of my invention to improve structurally on machines for making this general type of knock-down boxes, and to provide an improved method by which the boxes may be made in collapsed condition so that no further operation will be required than to ship them to the user in the collapsed condition in which they are made.

It is my object, as in my above mentioned patent, to provide a machine which will take cut and scored blanks in sequence from a supply, which will perform a series of folding operations on the blanks while they move continuously through the machine, and which will deliver them in completely assembled, collapsed condition, ready for shipment.

As distinguished from my above mentioned patent, my present method comprises the folding of triangular corner flaps on opposite side walls of the boxes after said walls have been brought at an angle to the portion of the blank forming the main body portion of the blank. In one example these walls are folded upwardly, and then the triangular corner portions are folded outwardly. In another example the side walls are folded upwardly and, incidental to said upward folding, the triangular corner portions are folded outwardly or in reverse direction. In a third example, said side wall portions are folded downwardly, and then the triangular corner portions are folded inwardly in the same direction. Then the side walls are folded upwardly and over onto the main body portion of the blank, to complete the knock-down box as in the previous examples.

In any of these examples, my invention is similar to that of my above mentioned patent, in that the folding of all portions as just above mentioned is done while the blank is in continuous motion. Also my present invention is similar to my invention of said patent in that the means for folding the triangular corner portions travels along with the blank at least during the period when such folding is to be done. Differing from my above mentioned patent, my present invention includes means traveling with the blank for folding the side wall triangular corner portions of the blank, whether the side walls be folded first and the folding of the triangular corner portions be done afterward, or the folding of the triangular portions be done incidentally to the folding of the side wall portions.

In the first two of these examples, I preferably employ two endless flexible conveyor elements, one below and the other above the path of travel of the blank, and one of these conveyors carrying with it the means for holding the side wall portions and the other carrying with it the means for folding the triangular corner portions.

After these side wall and triangular corner flap folding operations are completed, the complete folding of the box into flat condition is performed in a manner and by means substantially similar to those set forth in my above mentioned patent, by folding bars so stationed and shaped as to take the upstanding or depending side walls with their oppositely folded corner flaps and bring the walls down on to the main body portion of the blank with the triangular corner flaps upward, and, by a succeeding mechanism folding in the end walls, with inwardly folded end flaps overlying the triangular corner flaps. In the interval between the side wall folding and end wall folding, adhesive is applied to either one of two flaps of each corner, causing one surface of the infolded corner flaps to adhere to another surface of the triangular portion, so that the end flaps of the end walls are secured to the side wall triangular flaps. This will result in a collapsed box, which can be set in self sustaining condition by simply pulling upward and outward on two opposite walls, with the end flaps of the end walls inside and extending across the diagonal folds that are made in forming the triangular flaps, and bracing the side walls against inward or outward collapse.

The folding of the end flaps of the end walls preferably follows the course of the folding of the side walls; and these end wall end flaps stand up or depend like the side walls, accordingly as the side walls are bent upward or bent downward, in one or the other of the examples above mentioned.

In the use of the terms side walls and end walls, by the former is meant the walls that are parallel with the direction of blank travel in the upward or downward folding and the outward folding of the corner flaps of these walls; the end walls, so called, being the walls that are transverse to this travel. It will be understood that either the so called side walls or the so called end walls may be the longer ones, and that the shape of the box is not controlling in this respect.

The object of my present improvement, as above broadly outlined, is to provide a simpler operation of the triangular corner flap folding means, by avoiding an up and down movement of the same and having merely an oscillating movement of the same, in the first example mentioned; and, still simpler, in the second example, by avoiding both movements of the same, as compared with such means in my prior patent above mentioned.

Other objects will appear in the course of the following description, illustrated by the accompanying drawings, in which—

Figure 2 is a plan view of the same.

Figure 3 is a perspective view of one of the blanks previous to the folding thereof.

Figure 4 is a similar view of the same when the side walls have been folded upward.

Figure 5 is a similar view when the triangular corner flaps of the side walls have been folded outward.

Figure 6 is a similar view when the end wall end flaps have been folded onto the end walls and the side walls with their folded corner flaps have been folded onto the bottom portion of the blank, and when triangular portions of adhesive have been applied to the end wall end flaps.

Figure 7 is a similar view when the end walls have had their end flaps adhered to the triangular flaps of the side walls by folding the end walls inward over the side walls.

Figure 8 is a perspective view of the box set up from the flat collapsed condition in which the box was completed as shown in Figure 7.

Figure 11 is a plan view of a continuation of the machine not shown in the previous figures, this being the part of the machine in which the end wall folding is done.

Figure 12 is a detailed plan view of a set of the devices for folding the triangular corner flaps of the side walls, still further enlarged.

Figure 13 is a detailed perspective view of one of the devices that folds the triangular flaps, on a still larger scale.

Figure 14 is a detailed perspective view of one of the pads and part of its rotary carrier, preferably employed for applying the triangular patch of adhesive to the end wall end flaps.

Figure 18 is a partial plan view corresponding to Fig. 9 in horizontal section, showing a modification in which the corner flap folding devices for the two sides of the box are staggered, for making a narrow deep box such as shown in Fig. 17.

Figure 19 is a perspective view of this narrow deep box blank folded, except for folding in and adhesively securing the end portions.

Figure 20 is a side elevation, omitting all but the essential details so as to be somewhat diagrammatical, showing a modification in which the walls are first folded downward and the corner flaps folded thereon, and then folded upward and over on top of the main body portion of the blank.

Figure 21 is a diagrammatic perspective view, illustrating the several stages of folding in the example of Fig. 20.

Referring to Figs. 3 to 8 inclusive, the blank has a main body $a$, opposite side wall portions $b$ and $c$, articulated to opposed edges of the body $a$, and opposed end wall portions $d$ and $e$, articulated to the other opposed side edges of the body $a$. Beginning at the outer corners of the lines of articulation of the side wall portions, there are score lines extending diagonally across the intermediate side wall portions $b$ and $c$, providing triangular flap portions $f$. The triangular flaps $f$ are fastened to the end wall end flaps $g$ to form a continuous articulated structure of the side walls and end walls. Extending from the ends of the wall portions are the rectangular flaps $g$. The purpose of forming these pieces rectangular is to reinforce the box against a tendency to bulge outwardly when it is opened.

In the type of blank which I have illustrated, the glue flaps in the finished collapsed box are secured to a triangular portion of the adjacent reinforcing flaps, but it will be understood the adhesive may either be applied to a triangular portion of the reinforcing flaps so as to register with the glue flaps, or the adhesive may be applied to the glue flaps themselves.

Figure 1:
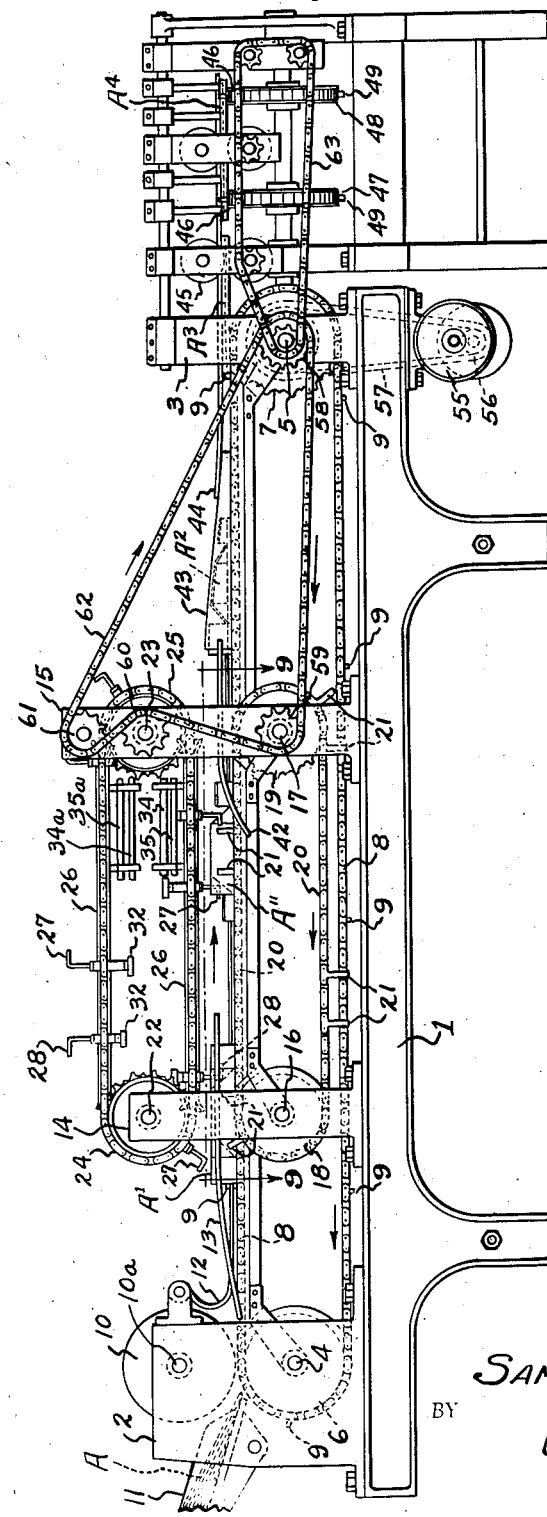
Figure 1 is a side elevation of a machine embodying one example of my invention.
Figure 9:
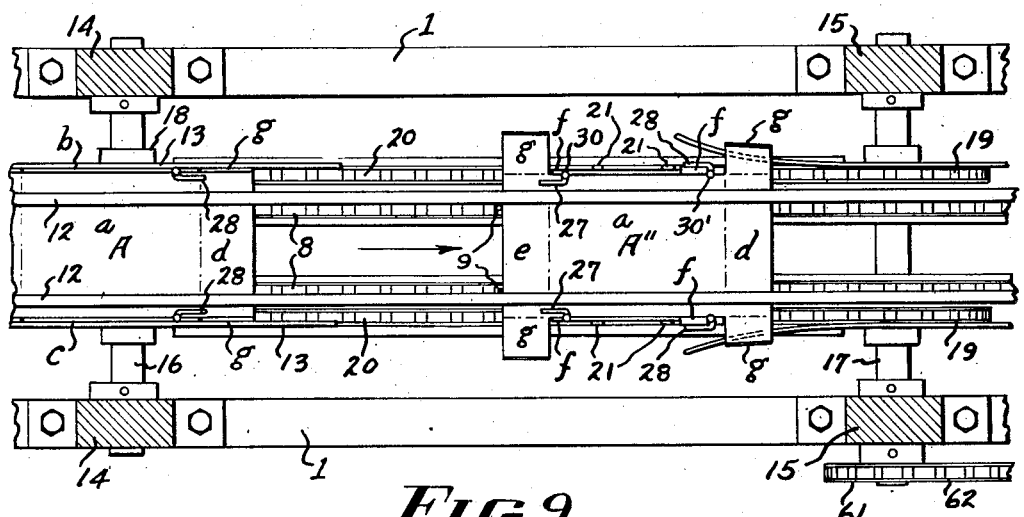
Figure 9 is a partial plan view, enlarged, and with upper parts of the machine omitted in order to clearly show the operation on the corner flaps of the upstanding side walls.
Figure 10:
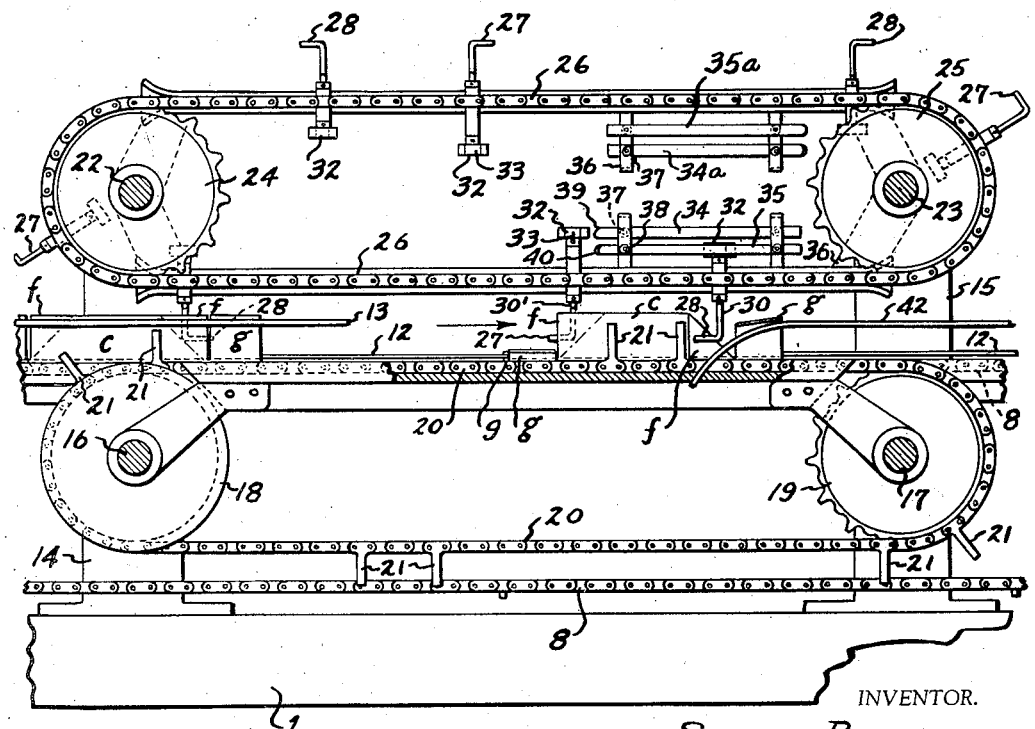
Figure 10 is a side elevation corresponding to the plan of Fig. 9, with side parts of the machine omitted to further illustrate the folding operation shown in Fig. 9.

The part of the machine which performs the folding operations on the side walls and the end wall end flaps comprises a base frame 1 having at its left end, as seen in Figs. 1 and 2, pedestals 2 and, at its right end, pedestals 3 in which are journaled transverse shafts 4 and 5, respectively, and which shafts carry pairs of sprocket wheels 6 and 7, respectively. Chains 8 pass around the sprocket wheels 6 and 7 and carry pins 9 outstanding from the chains at equal intervals. Over the left hand sprocket wheels, rollers 10 are mounted on a shaft 10a mounted transversely in the pedestals 2, these rollers 10 coacting with the chains 8 to take the box blanks A fed successively therebetween from a chute 11 at the left, and to pass each blank A under hold-down bars 12 at the right. At the opposite sides of the conveyor made up of these chains 8, are folding bars 13 which slope up from near the sprocket wheel 6 and then continue horizontally for a limited distance to the right.

These folding bars 13 are so shaped and positioned that the opposite side wall portions $b$ and $c$ and the end wall end flaps $g$ will be folded upward to a substantially vertical position as seen in the blank at A'.

Also mounted on the base frame 1 and spaced in from the pedestals 2 and 3 are the left hand standards 14 and the right hand standards 15, the latter being somewhat higher than the former. Lower transverse shafts 16 and 17 are journaled in the standards 14 and 15, respectively, and carry sprocket wheels 18 and 19 in pairs, around which pass sprocket chains 20. These elements are so located that the upper stretches of the chains 20 travel in the horizontal plane of and at opposite sides of the upper stretches of the blank carrying chains 8 above described. Outstanding from and fixed on the chains 20 at equal intervals are pairs of arms 21. These arms 21 are so located, and the travel of the chains 9 and 20 is so timed, that as the blank A' reaches the left hand sprocket wheels 18 a pair of arms 21 comes up at each side around the sprocket wheel 18 at that side into position to hold the side wall portions b and c in their raised positions to which they were brought by the folding bars 13 as before described; and the pair of arms will travel with the blank in this relation to it, until they pass downwardly around the right hand sprocket wheels 19.

Above the mechanism just described upper transverse shafts 22 and 23 are journaled in the pedestals 14 and 15 respectively and carry pairs of sprocket wheels 24 and 25, respectively, around which pass upper chains 26, in such position that lower stretches of these chains 26 travel in a horizontal plane a short distance above the upper edges of the upwardly folded blank portions.

These chains 26 carry, at intervals corresponding to the intervals of location of the arms 21 on the lower chains 20, sets of elements each comprising a finger 27 and 28 respectively at the left and right when in the lower stretch of travel.

Each one of these sets comprises a bearing block 29 projecting inwardly across the machine from the chain 26, a shaft 30 or 30' journaled vertically in the block 29, a collar 31 on this shaft below the bearing, and a cam member 32 fixed on the shaft above the bearing. The cam member 32 is a disc with part of its periphery having a flat portion 33. The left hand shaft 30' is longer above the bearing block 29 than the left hand shaft 30 to carry the left hand cam 32 in a higher plane than the right hand cam, in the lower stretch of travel, and, in the upper stretch, in a lower plane. Below, near the right hand sprocket wheels 25, cam bars 34 and 35 are stationed at the opposite sides of the machine in the higher plane and the lower plane, to coact with the higher and lower cam members 32 of the left hand and right hand set, respectively; there being a pair of supports 36 for these bars 34 and 35, on which the bars are yieldingly held toward the path of the cam members 32 by springs 37 and 38 respectively; and the left hand ends of the bars being bent away from said path to form aproaches 39 and 40, respectively on which the circular portions of the discs or cam members 32 roll until the cam flattened portions 33 come into sliding contact with the succeeding straight portions of these bars.

The shafts 30 and 30' have compound bends 41 just below their collars 31 and from there extend down some distance and are then bent at right angles, forming the fingers 27 and 28 respectively. The bars 34 and 35 face in opposite directions transversely of the machine, the upper bar 34 facing outwardly, so that the above described coaction of the left hand cam member 32 therewith rotates the shaft 30 in counterclockwise direction; and the lower bar 35, by the same kind of coaction, will rotate the right hand shaft 30' in clockwise direction. The effect of this is to swing the left hand finger 27, which has been extending to the left with the offset 41 extending inward, through an angle of 180 degrees, pushing the left hand triangular portion f at the corner of the side wall b or c outward and around across the main portion of the wall b or c, and then pushing this portion f inward and with it the main portion, until the wall b or c inclines inward over the bottom portion a of the blank. The right hand device, preceding the device just described, has swung its finger 28, which had been extending to the right, through a like angle to the left, and has pushed the advanced triangular portion f out and around and inward; the two fingers 28 and 27 both acting to incline the wall b or c inward with its corner flaps turned outward. At A'' in Fig. 1 the above described action of the advanced or right hand finger 28 has occurred; and the action of the left hand finger 27 is about to occur. The arms 21 hold the side wall b or c inward as the fingers press outward on the corner flaps f. The end wall end flaps g here have left their folding bars 13, and will have sprung partly downwardly; but will again be raised by the final folding device of this part of the machine, later to be described.

To restore the fingers 27 and 28 to their positions in which they extend in opposite directions inward from the paths of the side walls b and c, an upper set of bars 34a and 35a depend from supports understood to be like those of the lower bars 34 and 35, below the upper stretches of the chains 26 in planes to coact with the cam members 32 of the respective fingers, as best seen in Fig. 1. It will be understood that these upper bars are shaped, positioned and mounted in the same manner as the lower bars.

The arms 21 are so spaced that they will lie well in between the fingers 27 and 28 at the greatest extent of these fingers toward each other, and escape the edges of the outwardly folded triangular flaps f. The pair of fingers will leave the thus folded side wall as they pass up around the right hand sprocket wheels 25.

The final folding mechanism of this part of the machine, before mentioned, comprises the folding bars 42 at opposite sides of the paths of the side walls and their corner flaps; these bars curving upwardly into the horizontal plane of these paths and converging inwardly along this upward extent, to horizontal portions in the plane of the paths. The upward curvature and convergence is such, and so located, that the fingers 27 and 28 will escape contact with the bars 42 by swinging above the plane of the bars before they reach the most inwardly converged parts of the bars. These bars, at the same time catch the triangular portions f of the blank just as the fingers 28 and 27 leave the portion so as to maintain the folded condition that was caused by the fingers. These bars also raise the end wall end flaps g from their partly sprung down condition.

The bars 42 lead to a second pair of folding bars 43, which have members sloping downwardly and converging in the direction of travel of blank, so as to complete the folding of the side walls b and c and the end wall end flaps g down onto the bottom portion a and end walls d and e. Thus, upon passing to the right from these folding bars 43 the blank will be as shown in Fig. 6, except that the adhesive has not been applied.

The blank thus folded is carried under hold down bars 44, which maintain this folded condition while rollers 45 bear on the middle of the blank to keep it flat, until the blank passes into position across a second conveying mechanism comprising sprocket chains 46 running on sprocket wheels 47 and 48 at right angles to the previous direction of travel; these chains having pins 49 that cause the blank to travel with these chains 46 with its end walls parallel with the direction of travel of this second conveyor.

The blank is shown being folded by the bars 43 at A2 in Fig. 2; and is shown passing to the second conveyor at A3; and is shown in an early stage of its travel on this second conveyor at A4, in Fig. 2. In Fig. 11 the blank is shown at A5 about to pass through the adhesive applying mechanism 50, understood to comprise triangular pads 51 as shown in Fig. 14, which apply the triangular patches *h* of adhesive to the end wall end flaps *g* as shown at A6 in Fig. 11, where the blank has just passed from the adhesive applying mechanism 50. This blank at A6 is entering between a final pair of folding bars 52 which slope down and converge in the direction of blank travel to complete the folding of the end walls, bringing the turned in adhesive bearing flaps *g* onto the triangular flaps *f*, so that the adhesive at *h* secures the flaps *f* and *g* together, with the blank in complete condition as seen at A7, where the blank is passing from the bar 52 to go under pressing rollers 53 which tightly press the flaps together to complete the adhesive connection. The completed collapsed boxes then are carried away by a tape or belt conveyor 54, ready for delivery to the user.

The entire machine is driven by a motor 55 connected by suitable reducing gearing 56 and sprocket connection 57 with the right hand shaft 5 of the main conveyor. This shaft 5 carries a sprocket pinion 58 and the right hand sprockets 19 and 25 have on their shafts 17 and 23, respectively, sprocket pinions 59 and 60. At the top of the standards 15 a sprocket wheel 61 is journaled; and a sprocket chain 62 passes around the several pinions 58, 59, 60 and 61 in the proper directions to drive the lower chain 20 and upper chain 26 of the first folding mechanism. A chain 63 drives the middle pressure rollers 45 from the conveyor shaft 5; and the conveyor chains 46 of the final folding mechanism are driven by bevel gearing 64 on the shaft 5 and the shaft 47*a* of the sprocket wheels 47 of these chains 46. The shaft 48*a* of the other sprocket wheels 48 of these chains 42 connects by sprocket chain 65 with the gluing mechanism 50, and with the final pressure rollers 53 by the gearing 66. Hold down bars 67 keep the side walls *b* and *c* and their corner flaps *f* in folded condition while passing along the second conveyor to the gluing mechanism 50 and from there until the bars 52 have brought the end walls *d* and *e* inward. This second folding mechanism is substantially the same as that shown in my prior patent above referred to.

Figure 15:
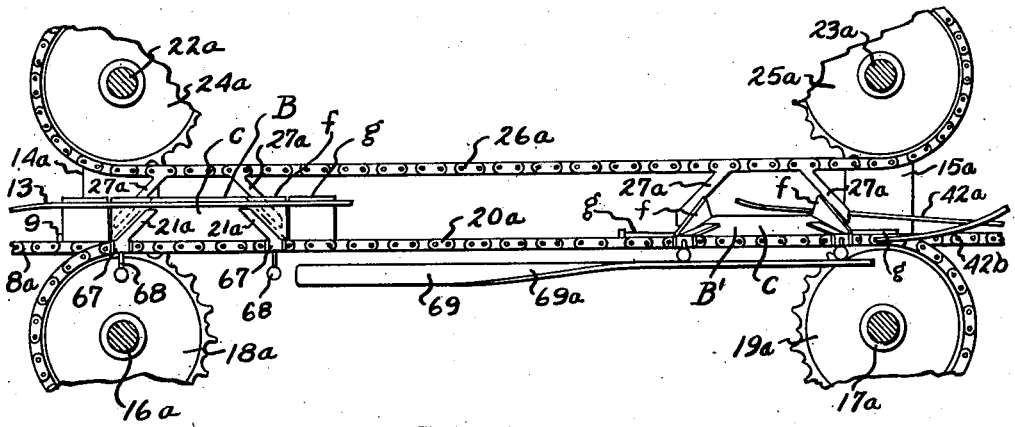
Figure 15 is a partial side elevation of a machine, understood, as to those parts not shown, to correspond with the machine shown in Fig. 1, and differing from said machine in the means for folding the side walls and their corner flaps and the end wall flaps.
Figure 16:
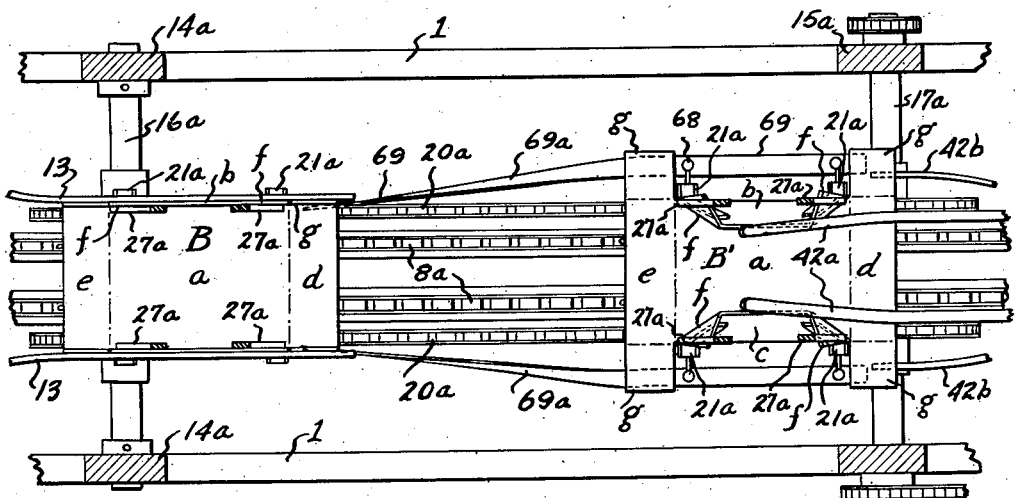
Figure 16 is a plan view of the same.

In the second example, shown in Fig. 15, there is a main conveyor chain 8*a*, a lower chain 20*a* and an upper chain 26*a*; all understood to be mounted and driven as are the corresponding chains in the first example; the sprocket wheels 18*a* and 19*a* and 24*a* and 25*a* for the chains 20*a* and 26*a* respectively, being shown with their shafts 16*a*, 17*a*, 22*a* and 23*a* respectively, as also are the standards 14*a* and 15*a* supporting the shafts.

The lower chain 20*a*, instead of carrying arms fixed thereon, carries a pair of arms 21*a* pivoted at 67 to swing laterally of the direction of travel, and having depending extensions 68 which act, when free of engagement, to hold, by gravity, the arms 21*a* in a vertical plane that is parallel with the direction of travel of the blank. These arms 21*a* incline toward each other at the angle of the diagonal folds of the triangular corner flaps *f* of the side walls *b* and *c*; and are so spaced that they contact the side walls *b* and *c* at the places where these folds are to be made; this being insured by timing of the chains 8*a* and 20*a* so that the pins 9 thus locate the blanks relative to these arms 21*a*. The folding bars 13 act as in the previous example to turn up the side walls *b* and *c* and the end wall end flaps *g* by the time the arms 21*a* have come up around the sprocket wheels 18*a*. This relation of the arms and blank is seen at D.

A cam bar 69 is placed at each side of the machine; each bar having its width vertical to receive the depending extension 68 of the arms 21*a*, and the bar 69 then twisting at 69*a* until its width is horizontal, thus causing the arms 21*a* to be swung in by the riding of the extension 68 riding up the twist 69*a* onto the horizontal parts of the cam bar. This folds the side walls *b* and *c* to an inclined position over the bottom part *a* as seen at B'.

The upper chain 26*a* instead of carrying oscillating fingers, carries fingers 27*a* which are fixed on the chains and diverged therefrom to extend downward within the areas of the corner flaps *f* of the blank; this relation to the blank being assured by timing of the chain 8*a* and chain 26*a*. When the side walls *b* and *c* are folded inward, these fingers 27*a* are engaged by the corner flaps *f* so as to be folded outward into positions somewhat inclined across the main part of the side wall *b* or *c* as seen at B'.

As the blank passes from the position at B' it passes under the folding bars 42*a* which incline downwardly and diverge in the direction of blank travel, so that they catch the partly folded corner flaps *f* under them near the inner edges of side walls *b* and *c* and then as the blank progresses, act farther out on these flaps *f* and press them and the side walls *b* and *c* into completely folded condition on the bottom part *a* of the blank. The end wall end flaps *g* having sprung down from the raised position at B by the time they reach the position B', a second pair of folding bars 42*b* incline upwardly and converge in the direction of blank travel in a manner similar to the bars 42 of the previous example, bringing the flaps *g* again to their upright positions. It will be understood that both sets of bars 42*a* and 42*b* end at the beginning of a pair of folding bars like the bars 43 in the first example, which complete the folding of the end wall end flaps *g*; and that from there on the box is completed by mechanism as shown in the first example.

Figure 17:
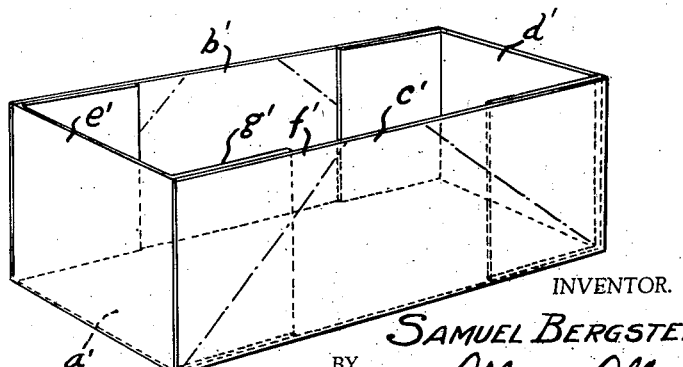
Figure 17 is a perspective view of a box which has its side walls and end walls of depth more than half the width of the bottom portion of the blank.

In Fig. 18 the devices that fold the corner flaps on the intermediate wall portions are not opposite to each other so as to act on a blank simultaneously, but are staggered along the path of the blank. This adapts the machine for making boxes which are so deep in proportion to their width, that the intermediate side wall portions come very close to each other, or interlap, when folded in across the bottom portion of the blank. Such a box is shown in Fig. 17; and in Fig. 19 the blank is shown with the relatively wide intermediate side wall portions *b'* and *c'* folded in across the bottom portion *a'*, and with the triangular corner flap portions *f'* facing upward. The end walls *e'* have their end flaps *g'* folded in upon them, but are not yet folded over onto the flaps *f'*. It will be seen that the end wall end flaps *g'* are not as wide as the intermediate portions *b'* and *c'*, across the blank; for the reason that if they were the full width, the overlying intermediate portion *b'* and its flaps *f'* would be overlapped by the end wall end flaps *g'* at the opposite side of the blank and would prevent these flaps *g'* from properly adhering to the triangular flaps *f'* at that side.

The details of construction of the machine as shown in Fig. 18 for making these deep narrow boxes are substantially the same as those of the first example of Figs. 1 and 2; the principal difference is being that they are arranged differently and there is some modification of the folding bars. It will be understood that the means for feeding the blanks to the mechanism, at the left, not shown, would be the same as in the first example. On account of the narrowness of the blanks, a single chain 8a only is provided as the main conveyor, and has transverse yokes 8b carrying the pusher pins 9a. It will be understood that this chain 8a is mounted and driven in the manner of the chains 8 of Figs. 1 and 2. Also only one hold down bar 12a is provided, bearing along the middle of the blank. The bar 13a which folds upward one lateral edge portion of the blank is shorter than the bar 13b that folds the other edge portion. Pairs of standards 14a and 15a stand up from the frame 1 and have journaled in them upper and lower shafts corresponding to the shafts 22 and 23, and 16 and 17, of the first example, to carry upper and lower conveying means for the devices that operate on the edge portions of the blank.

In this example, however, there is conveying means at one side only at the first stage of upfolding, comprising a single pair of upper sprocket wheels 24a and 25a on the upper shafts 22a and 23a, respectively, and a lower chain on sprocket wheels on the lower shafts, the latter not being visible in Fig. 18, but being understood to carry hold up means such as the arms 21 of Fig. 1. The upper chain 26a carries the fingers 27 and 28 with their cams 32 operated by cam bars 34 and 35, mounted on springs 37 and 38 which are supported by structure 36a mounted on the upper shafts 22a and 23a by bearing members surrounding the shafts. The folding bar 13a at that side having turned up the intermediate portions c' and end wall end portions g', it will be understood that these fingers 27 and 28 fold the corner flaps f' while the holdup means on the lower chain, at 21a holds up the part c'; this operation being the same as described for the first example.

During this operation the folding bar 13b at the opposite side, which has folded up the portions b' and g' of the opposite edge of the blank acts as the holdup means; being continuous alongside a succeeding portion of the path of the blank, where a folding bar 42a inclining down and inward, folds in over the middle parts of the blank the intermediate wall portions c' that has had its corner flaps f' folded, and also the flaps g'. Succeeding these devices along the path, additional pairs of standards 14b and 15b support upper and lower shafts, the upper shafts 22b and 23b being seen, together with their sprocket wheels 24b and 25b, carrying the upper chain 26b, which carries fingers 27' and 28' at the opposite side of the path, where the lower chain, not seen, carries holdup arms 21b for holding up the intermediate wall portion b' while the fingers 27' and 28' fold the corner flaps f'. These fingers 27' and 28' are operated by their cams 32 coacting with cam bars 34' and 35' on supports with springs 37', these supports bearing on the shafts 22b and 23b at 36b.

From this mechanism the blank passes to a folding bar 42b at that side of the path which folds down the portions b' with their flaps f', and the end wall end portions g', by the downward and inward inclination of this folding bar. The remainder of the machine is not shown; but it will be understood that from the folding bar 42b the blank would pass to a second conveyor such as the device having the chains 46 in Fig. 1, where the end walls e' would be folded over, bringing their flaps g' onto the triangular flaps f' after adhesive had been provided to be between the flaps.

In the example of Figs. 20 and 21, the machine will be understood to be similar to that of Fig. 1. However, folding bars 13d fold the intermediate wall portions b and c downwardly, along with the end wall end flaps d. Hold down bars 21d continue from the folding bars 13d, to hold the portions b and c, and the portion g, in depending positions against depending arms 21e mounted on the chains 8d, while the fingers 27d and 28d fold the corner portions f inward; operating in the manner of the fingers of the previous examples, and having cams 32 coacting with cam bars 34d and 35d for the folding action, and with cam bars 34e and 35e for return from folding movement as they are carried around on chains 26d traveling on sprocket wheels 18d and 19d.

This mechanism is succeeded by pairs of folding bars 42d and 42e, curving upward and inward over the chains 8d at the opposite sides, so that they receive between them the end wall end flaps g and the intermediate side wall portions d and c with their folded triangular flaps f, and give these parts a turn of about 270 degrees, so that they are folded in to overlie the middle portions a, d and e of the blank, as seen at the right in Fig. 21. In this figure the preceding blanks at the left are seen in their conditions at three different stages of travel in the course of the operations above described. When the blank has been folded as above described, it passes to the conveyor shown at the right in Fig. 21, and understood to be the same as the final conveyor in Figs. 1, 2 and 11, for folding the end walls d and e over and adhesively securing their flaps g to the triangular flaps f.

It will be seen that, in this last described example, only one pair of chains is needed for carrying means to fold the corner flaps f, instead of requiring a second pair of chains for the means that cooperates in this folding. In this last example this cooperative means is carried on the conveyor chains 8d that support the blank; preferably comprising pairs of bars 8e extending laterally under the body portions a, with depending lugs 21a. Bars 8f similarly extend from the chains 8d under the end wall parts d and e of the blank. These bars 8e and 8f afford supports over which the intermediate side wall portions b and c and end wall end flaps g may be folded downward. The arms 21e resist infolding of the side wall portions b and c while the triangular flaps f are folded.

The relative simplicity of this example gives it advantages over the examples in which the side wall portions b and c are folded upward for folding their triangular corner flaps f, notwithstanding that these side wall portions b and c as well as the end wall end flaps g, first folded downward, must then be folded about 270 degrees upward and inward to complete the box.

It will be understood that modifications other than those set forth herein may occur, and that although I have rather specifically illustrated and described my invention, I am not limited to such precise disclosure, but what I claim as new and desire to secure by Letters Patent is:

1. In a machine for making knock-down boxes from blanks, each of which has two slits in each of two opposite edges to form an intermediate wall portion between two flaps, means for carrying the blank with its slitted edges parallel with the direction of carrying, means for folding the intermediate wall portions on lines parallel with the direction of carrying, means moving with the blank to hold said intermediate wall portions in their folded positions, and means moving with the blank for folding triangular corner flaps of said intermediate wall portions into such positions on said wall portions that when said wall portions are folded inward onto the main part of the blank, the folded triangular flaps will be presented outwardly, said machine comprising means to fold said intermediate wall portions as aforesaid, and to fold the first mentioned flaps inward onto the respective end wall portions of the blank, and means to fold the blank on lines at right angles to the slitted edges to bring said end portions inward and bring said first mentioned flaps against the triangular flaps, after adhesive has been applied so as to be between the meeting flaps.

2. In a machine as set forth in claim 1, mechanism oscillating the means to fold the triangular corner flaps.

3. In a machine as set forth in claim 1, mechanism which oscillates the means to fold the triangular corner flaps, while restricting said means from movement along the axis of oscillation.

4. In a machine as set forth in claim 1, mechanism which imparts a folding motion to the means for folding the triangular corner flaps while said means is traveling with the blank.

5. In a machine as set forth in claim 1, mechanism which imparts a folding motion to the means for folding the triangular corner flaps, comprising coacting cam elements, one operatively connected to and traveling with said means, and having a certain engaging surface, and the other having an engaging surface extended along the line of travel and coacting with the engaging surface of the one means, to hold the triangular flap folding means whereby it maintains the triangular flap in its folded condition until succeeding folding means may act thereon, and said machine also comprising mechanism to return the flap folding means to position for folding the corner flaps of a following blank, and retain said folding means in the returned position until it comes into operative relation with the following blank.

6. A machine as set forth in claim 1, in which the means for holding the intermediate wall portions in their folded position has its movement limited to its plane of travel along with the blank.

7. A machine as set forth in claim 1, in which there is a mechanism comprising an endless chain to carry along with the blank the means that holds the intermediate wall portions in their folded positions, and in which there is mechanism comprising a second endless chain to carry along with the blank the means for folding the triangular corner flaps.

8. In a machine as set forth in claim 1, mechanism which imparts a rotary motion to the means for folding the triangular corner flaps, while restricting said means from movement along the axis of the rotary movement.

9. A machine as set forth in claim 1, in which the means that holds the intermediate wall portions has, in addition to its movement along the line of travel of the blank, a movement across said line, to additionally fold inwardly said intermediate wall portions, and in which the means for folding the triangular corner flaps effects this folding in coaction with the means additionally folding said intermediate wall portions.

10. A machine as set forth in claim 1, in which the means that holds the intermediate wall portions has, in addition to its movement along the line of travel of the blank, a movement across said line, to additionally fold inwardly said intermediate wall portions, and in which the means for folding the triangular corner flaps has its movement limited to its plane of travel along with the blank and effects the folding of said corner flaps due to the movement of the intermediate wall portion holding means across the line of travel of the blank.

11. A machine as set forth in claim 1, in which the means for folding the intermediate wall portions raises said wall portions above the main body portion of the blank, and in which said intermediate wall portions are engaged by the means to hold them in raised position while said folding means maintains contact with said wall portions, and in which the means for folding the triangular corner flaps travels along a path inward from the folding and holding means over the main body portion of the blank, and acts outwardly around the intermediate areas of the intermediate wall portions to fold the triangular corner flaps thereof therearound.

12. A machine as set forth in claim 1, in which the means for folding the intermediate wall portions raises said wall portions above the main body portion of the blank, and in which said intermediate wall portions are engaged by the means to hold them in raised position while said folding means maintains contact with said wall portions, and in which the means for folding the triangular corner flaps travels along a path inward from the folding and holding means over the main body portion of the blank, and has its movement limited to its plane of travel along with the blank, and in which the means that holds the intermediate wall portions up has, in addition to its movement along the line of travel of the blank, a movement across said line, additionally folding inwardly said intermediate wall portions and bringing the triangular corner flaps against the folding means therefor, whereby this latter means causes the folding of the corner flaps into positions inclined across the intermediate areas of said intermediate walls, said machine also comprising means acting from near the top edges of the intermediate wall portions outwardly and downwardly on the thus inclined corner flaps to further fold the corner flaps toward said intermediate areas and said intermediate wall portions toward the main body portion of the blank, in the course of further travel of the blank.

13. A method of making knock-down boxes from blanks, each of which has two slits in each of two opposite edges to form an intermediate wall portion between two flaps, which comprises carrying the blank with its slitted edges parallel with the direction of carrying, folding the intermediate wall portions on lines parallel with the direction of carrying while the blank is being carried along, holding said intermediate wall portions in their folded positions while the blank is further carried along, folding triangular corner flaps of said intermediate wall portions in the course of further travel, into such position that when said intermediate wall portions are folded inward onto the main part of the blank the folded triangular flaps will be presented outwardly, then folding said intermediate wall portions inward as aforesaid, together with the first mentioned flaps, in the course of further travel of the blank, and then folding the blank on lines at right angles to the slitted edges to bring the first mentioned flaps against the triangular flaps with adhesive between the meeting flaps, in the course of still further travel of the blank.

14. A method of making knock-down boxes from blanks, each of which has two slits in each of two opposite edges to form an intermediate wall portion between two flaps, which comprises carrying the blank with its slitted edges parallel with the direction of carrying, folding the intermediate wall portions on lines parallel with the direction of carrying while the blank is being carried along, holding said intermediate wall portions in their folded positions while the blank is further carried along, pressing laterally outward on corner areas of said intermediate wall portions and thereby folding triangular corner flaps laterally outward on said intermediate walls while said intermediate walls are held in said folded positions, and then completing the knock-down box by folding the first mentioned flaps and the intermediate wall portions inward onto the main part of the blank with the folded triangular flaps presented outwardly, in the course of further travel of the blank, and by folding the blank on lines at right angles to the slitted edges to bring the first mentioned flaps against the triangular flaps with adhesive between the meeting flaps, in the course of still further travel of the blank.

15. A method of making knock-down boxes from blanks, each of which has two slits in each of two opposite edges to form an intermediate wall portion between two flaps, which comprises carrying the blank with its slitted edges parallel with the direction of carrying, folding the intermediate wall portions upwardly on lines parallel with the direction of carrying while the blank is being carried along, holding said intermediate wall portions in their raised positions while the blank is further carried along, folding triangular corner flaps of said intermediate wall portions laterally outwardly, and then completing the knock-down box by folding the first mentioned flaps and the intermediate wall portions inward onto the main part of the blank with the folded triangular flaps presented outwardly, in the course of further travel of the blank, and by folding the blank on lines at right angles to the slitted edges to bring the first mentioned flaps against the triangular flaps with adhesive between the meeting flaps, in the course of still further travel.

16. A method of making knock-down boxes from blanks, each of which has two slits in each of two opposite edges to form an intermediate wall portion between two flaps, which comprises carrying the blank with its slitted edges parallel with the direction of carrying, folding the intermediate wall portions on lines parallel with the direction of carrying while the blank is being carried along, pushing laterally inwardly on an intermediate area of each intermediate wall portion while opposing the inward movement of corner areas of each of said wall portions and thereby folding triangular corner flaps laterally outward on said intermediate walls incident to the pushing of said intermediate areas inwardly, and then completing the knock-down box by folding the first mentioned flaps and the intermediate wall portions inward onto the main part of the blank with the folded triangular flaps presented outwardly, in the course of further travel of the blank, and by folding the blank on lines at right angles to the slitted edges to bring the first mentioned flaps against the triangular flaps with adhesive between the meeting flaps, in the course of still further travel of the blank.

17. A method as set forth in claim 13, in which the two flaps first mentioned therein are folded along with the intermediate wall portions, on substantially the same lines and in the same direction but are released when the intermediate wall portion is held as the blank is further carried along, and then after the triangular corner flaps are folded on said intermediate wall portions said first mentioned flaps are returned to their folded condition from positions into which they may have moved while not being held, this return of the flaps to said position being prior to the completion of the knock-down box as therein specified.

18. In a machine for making knock-down boxes from blanks, each with two slits in each of two opposite edges to form an intermediate wall portion between two flaps, a conveyor to carry the blanks, means to fold the intermediate wall portions and said flaps on lines parallel to the conveying direction, two additional conveyors traveling along with the blank carrying conveyor, and elements carried on the respective conveyors, one engaging one side of each intermediate wall portion and the other engaging the opposite side of each said portion, the elements carried on one conveyor being movable laterally relative to those carried on the other conveyor, and the elements at the opposite sides of said wall portion being offset from each other and so positioned as to fold triangular corner flaps laterally outwardly relative to the intermediate area of each said wall portion, and means for driving the several conveyors in timed relation with the blanks positively located on the blank carrying conveyor, whereby the elements on the other conveyors travel with the respective blanks in operative relation thereto as aforesaid, said machine also comprising means to fold the first mentioned flaps and the intermediate wall portions inward onto the main part of the blank with the folded triangular portions presented outwardly, and means to fold the blank on lines at right angles to the slitted edges to bring the first mentioned flaps against the triangular flaps after adhesive has been applied so as to be between the meeting flaps.

19. A machine as set forth in claim 1, in which the means that folds the intermediate wall portions on lines parallel with the direction of carrying folds said wall portions downwardly, and the means that folds the triangular corner flaps folds said flaps while said intermediate wall portions are folded downwardly, and the means that folds said intermediate wall portions onto the main part of the blank folds said intermediate wall portions from their downwardly folded positions to their positions outlying said main part with the triangular flaps facing upward.

20. A machine as set forth in claim 1, in which the means that folds the flaps on the intermediate wall portions of the blanks comprises units staggered along the path of travel of the blanks, to operate on the two opposite wall portions dissimultaneously, for the purposes set forth.

SAMUEL BERGSTEIN.